United States Patent
Bergman et al.

(10) Patent No.: US 8,914,067 B2
(45) Date of Patent: Dec. 16, 2014

(54) UPLINK TRANSMIT DIVERSITY

(75) Inventors: Johan Bergman, Stockholm (SE); Johan Hultell, Solna (SE); Niklas Johansson, Uppsala (SE); Erik Larsson, Uppsala (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/500,116

(22) PCT Filed: Oct. 5, 2010

(86) PCT No.: PCT/SE2010/051076
§ 371 (c)(1),
(2), (4) Date: Apr. 4, 2012

(87) PCT Pub. No.: WO2011/043727
PCT Pub. Date: Apr. 14, 2011

(65) Prior Publication Data
US 2012/0196637 A1    Aug. 2, 2012

Related U.S. Application Data

(60) Provisional application No. 61/248,628, filed on Oct. 5, 2009.

(51) Int. Cl.
*H04B 7/24* (2006.01)
*H04B 7/06* (2006.01)
*H04B 7/04* (2006.01)

(52) U.S. Cl.
CPC ............ *H04B 7/0617* (2013.01); *H04B 7/0621* (2013.01); *H04B 7/0686* (2013.01); *H04B 7/0417* (2013.01); *H04B 7/063* (2013.01); *H04B 7/061* (2013.01); *H04B 7/0404* (2013.01)
USPC ...................................... 455/562.1; 455/101

(58) Field of Classification Search
CPC ...... H04B 7/061; H04B 7/063; H04B 7/0617; H04B 7/0621; H04B 7/04; H04B 7/0404; H04B 7/0417
USPC .......... 455/550.1, 561, 562.1, 575.1, 91, 101, 455/102, 103, 277.1, 277.2; 375/260, 267, 375/299
See application file for complete search history.

(56) References Cited

U.S. PATENT DOCUMENTS 7,746,943 B2 * 6/2010 Yamaura ........................ 375/260
2004/0038713 A1 * 2/2004 Okawa et al. ................. 455/561
(Continued)

FOREIGN PATENT DOCUMENTS

WO    2005039233 A1    4/2005
WO    2008113022 A1    9/2008

OTHER PUBLICATIONS

3rd Generation Partnership Project. "Uplink Transmission Schemes for Multi-Antenna UE." 3GPP TSG-RAN WG1 #54bis, R1-083829, Prague, Czech Republic, Sep. 29-Oct. 3, 2008.

(Continued)

*Primary Examiner* — Thanh Le
(74) *Attorney, Agent, or Firm* — Coats & Bennett, P.L.L.C.

(57) ABSTRACT

The present invention discloses a method in a wireless access network node for controlling a UE. The UE comprises at least two transmit antennas, and is capable of uplink transmit diversity. There is an antenna weight associated with each transmit antenna. First, the wireless access network node determines that the antenna weights of the user equipment may be controlled. Then, it creates a control signal that comprises control information and transmits it to the user equipment. The control information controls a UE autonomous selection of the antenna weights in the UE.

24 Claims, 5 Drawing Sheets

(56) References Cited

U.S. PATENT DOCUMENTS

| | | |
|---|---|---|
| 2006/0135079 A1 | 6/2006 | Barnett et al. |
| 2008/0214128 A1* | 9/2008 | Lim et al. ............. 455/101 |
| 2009/0239486 A1* | 9/2009 | Sugar et al. ........... 455/101 |
| 2009/0239565 A1 | 9/2009 | Han et al. |

OTHER PUBLICATIONS

3rd Generation Partnership Project. "3rd Generation Partnership Project; Technical Specification Group Radio Access Network; Evolved Universal Terrestrial Radio Access (E-UTRA); Physical Layer Procedures (Release 8)." 3GPP Standard, 3GPP TS 36.213, V8.8.0, pp. 1-81, Sophia Antipolis Cedex, France, Sep. 1, 2009.

3rd Generation Partnership Project. "Uplink SU-MIMO Design Options for LTE Advanced." 3GPP TSG RAN1 #56, R1-090805, Athens, Greece, Feb. 9-13, 2009.

3rd Generation Partnership Project. "Multi-Antenna Uplink Transmission for LTE-A." 3GPP TSG-RAN WG1 #56, R1-090794, Athens, Greece, Feb. 9-13, 2009.

* cited by examiner

UPLINK TRANSMIT DIVERSITY

TECHNICAL FIELD

The present invention relates to wireless communications. More specifically, the present invention relates to uplink transmit diversity in wireless communications.

BACKGROUND

Currently the Third Generation Partnership Project (3GPP) is evaluating the potential benefits of uplink transmit diversity in the context of High-Speed Uplink Packet Access (HSUPA), see 3GPP Tdoc RP-090987. With uplink transmit diversity, User Equipments (UEs) that are equipped with two or more transmit antennas are capable of utilizing all of them. This is achieved by multiplying the signal s(t) with a set of complex weights $w_i$; see FIG. 1. Note that i=1 ... N where N denotes the number of transmit antennas. The rationale behind uplink transmit diversity is to adapt the weights so that the user and network performance is maximized. Depending on UE implementation, the antenna weights may be associated with different constraints. Within 3GPP two classes are considered:

Switched antenna diversity, where the UE at any given time-instance transmits from one of the antennas only. Thus if $w_i \neq 0$, then $w_j = 0$ for all $j \neq i$.

Beam forming, where the UE at a given time-instance can transmit from more than one antenna simultaneously.

While switched antenna diversity is possible for UE implementations with a single power amplifier (PA) the beam forming solutions may require one PA for each transmit antenna. I.e., beam forming requires one PA for each active antenna.

Irrespective of the considered class, the selection of the antenna weights can be based on that:

The Node-B provides explicit feedback to the UE stating which weights $w_i$ i=1 ... N that the UE should use when transmitting the signal. This would require that a new feedback channel is introduced; or The UE autonomously decides the antenna weights. To select the weights $w_i$ i=1 ... N the UE may monitor existing feedback channels (that are transmitted for other purposes) such as Fractional-Dedicated Physical Channel (F-DPCH) or Enhanced Dedicated Transport Channel Hybrid Automatic Repeat Request Acknowledgement Indicator Channel (E-HICH).

As mentioned above, the fundamental idea behind uplink transmit diversity is to exploit the variations in the effective channel. The term effective channel here incorporates the effects of the transmit antenna(s), transmit antenna weights, the receiving antenna(s), as well as the wireless channel between transmitting and receiving antennas. Finally, note that both switched antenna diversity and beam forming transmit diversity may result in that the antenna weights are changed abruptly, e.g., if a UE that applies switched antenna diversity changes antenna and starts transmitting on antenna 2 instead of antenna 1 then w1/w2 will change from 1/0 to 0/1. A consequence of this is that the effective channel as perceived by the receiving Node-B may change abruptly.

A Node-B receiver uses channel estimates based on a filtered version of the instantaneous channel, as estimated by the Node-B. Also, the interference estimate used, e.g., in the inner loop power control (ILPC) is based on a filtered version of the instantaneous interference measured by the Node-B.

Hence, whenever the UE changes its antenna weights—and especially if the change is abrupt such as in switched antenna diversity, or with significant changes to the weights in beam forming—the channel estimates used by the receiver will become inaccurate. This reduces the receiver performance. A UE change in antenna weights will also result in that the interference caused by this UE is changed abruptly. This, sometimes referred to as flash light effects, will be particularly true in situations where the interference is on a cell edge where it is likely to be a dominating interference to another UE.

One may realize that situations where the UEs constantly change their antenna weights abruptly may result in reduced overall performance. This is among other things a consequence of the uncoordinated UE behavior, which may result in increased interference variations. The potential gain arising associated with uplink transmit diversity schemes will also depend on the channel's coherence time.

Another final implication of uplink transmit diversity is that there will be a discontinuity in the power received by the Node-B whenever the effective channel between the UE and Node-B changes. The discontinuity will be a combined effect of that:

The wireless channels between the two or more transmit antennas and the receiving antenna(s) are different, and The antenna gains of the two or more transmit antennas are different.

As there is a discontinuity in the received power, the performance of the power control may be affected. A discontinuity in the received power may lead to a transient time period, or convergence time, until the outer loop power control (OLPC) and ILPC have settled. The transient time period may cause supplementary interference variation, having a negative impact on the system. Also, if the UE switches to an antenna with less favorable conditions, or if the channel estimates become so inaccurate that Node-B fails to demodulate the data, this may result in that the OLPC Signal-to-Interference Ratio (SIR) target is increased even if the link quality has improved.

SUMMARY

It is the object of the present invention to mitigate at least some of the mentioned conditions. An object of embodiments of the invention is to allow uplink transmit diversity transmission from one antenna at a time (i.e., switched antenna transmit diversity), and to allow uplink transmit diversity transmission from at least two transmit antennas simultaneously (i.e., transmit beam forming). An object of embodiments of the invention is to allow uplink transmit diversity without requiring the addition of a dynamic feedback channel between the network and the UE. An object of embodiments of the invention is to allow the network to be aware of changes to the UE's antenna weights without specifying to the UE which antenna weights to use in uplink transmit diversity.

The drawbacks mentioned above could be reduced if the Node-B were aware of that the UE had changed, or was to change, its antenna weights. There are also contexts where it from a system performance point of view could be beneficial to prohibit the use of uplink transmit diversity.

This may be the case when a UE interferes significantly with other users, e.g. when being close to the cell border, and therefore the system as a whole would benefit from that particular UE disabling uplink transmit diversity. Another example would be when a cell is overloaded or for any other reason manipulates the transmit power control (TPC) commands sent on F-DPCH so that they do not reflect the short term link quality. Embodiments of the present invention enable the network to control when UEs are allowed to use uplink transmit diversity techniques.

According to an embodiment of the present invention, a method in a wireless access network node for controlling a UE is disclosed. The UE comprises at least two transmit antennas, and is capable of uplink transmit diversity. There is an antenna weight associated with each transmit antenna. First, the wireless access network node determines that the antenna weights of the user equipment may be controlled. Then, it creates a control signal that comprises control information and transmits it to the user equipment. The control information controls a UE autonomous selection of the antenna weights in the UE.

According to another embodiment, a method in a user equipment is disclosed. The user equipment is adapted to be used in a wireless access network, and is controlled by a wireless network node. The user equipment comprises at least two transmit antennas, and is capable of uplink transmit diversity, whereby an antenna weight is associated with each transmit antenna. The method comprises receiving a control signal from the wireless network node, where the control signal comprises control information controlling an autonomous selection of the antenna weights in the UE. Further, the method comprises performing an autonomous selection of the antenna weights according to the control information.

According to a further embodiment, a method in a user equipment is disclosed, where the user equipment is adapted to be used in a wireless access network, and is controlled by a wireless network node. The user equipment comprises at least two transmit antennas, and is capable of uplink transmit diversity, whereby an antenna weight is associated with each transmit antenna. The method comprises performing an autonomous selection of the antenna weights, and transmitting a control signal to the wireless network node, in which the control signal comprises information on an autonomous selection of the antenna weights.

According to a further embodiment, a wireless access network node is adapted to control a user equipment comprising at least two transmit antennas. The user equipment is capable of uplink transmit diversity, and has an antenna weight associated with each transmit antenna. The wireless network node comprises a determining unit that is adapted to determine that the antenna weights of the user equipment may be controlled, a signal unit adapted to create a control signal comprising control information, and a transmitter adapted to transmit the control signal to the user equipment. The control information is adapted to control a user equipment autonomous selection of the antenna weights.

According to a further embodiment, a user equipment is adapted to be used in a wireless access network. The user equipment is adapted to be controlled by a wireless network node, wherein the user equipment comprises at least two transmit antennas. The user equipment is capable of uplink transmit diversity, and has an antenna weight associated with each transmit antenna. The user equipment further comprises a receiver adapted to receive a control signal from the wireless network node, the control signal comprising control information controlling an autonomous selection of the antenna weights, and an antenna weight selector adapted to autonomously select the antenna weights according to the control information.

Embodiments of the invention are applicable to both single-carrier (SC-) HSUPA and multi-carrier (MC-) HSUPA systems. Here, MC-HSUPA refers to a generalization of SC-HSUPA in which the UE is able to transmit more than one transport channel per uplink carrier.

According to different embodiments of the invention, the following are disclosed:

A method where the network node transmits a control signal to a UE ordering it to switch antenna.

A method where the network node transmits a control signal to a UE that allows it to autonomously switch antenna, i.e. the UE selects the antenna weights. In different embodiments different rules may be applied. For example, upon receiving the control signal the UE may be allowed change antenna a predetermined number of times, for a pre-deter wined time-period, until the UE receives an order to stop, or until a serving cell change occurs. The rule may also specify the time-instances that the UE is allowed to change antenna.

A method where UE sends a signal to indicate that it has changed, or will change, its transmit antenna at a well defined point in time.

Different embodiments of the invention may be based on one or more of the above aspects. Embodiments of the invention comprise different methods in the network node and UE. Also comprised according to embodiments of the present invention are apparatuses adapted to control transmissions, transmit or receive data or control signaling.

The invention is applicable to both switched transmit diversity and beam forming. For the latter case however, one should instead of antenna switch refer to situations where an abrupt change in antenna weights occurs. For clarity, the description focuses on the case of switched antenna diversity.

Embodiments of this invention are associated with the following advantages:

Embodiments allow the network to control which UEs that should apply uplink transmit diversity, and when they should do so. This enables the network to decide that the gains enabled from uplink transmit diversity are obtained by the UEs which would benefit the most (for example the UEs experiencing the worst propagation conditions.

Embodiments allow the network to be aware of when an UE switches antennas. This is may be beneficial for the network because it could enable to obtain accurate channel estimates faster (e.g., by keeping two set of estimates associated with each transmit antenna or by discarding the existing estimates corresponding to the other antenna) or freeze the OLPC during the transient phase following an antenna switch.

By restricting the UE to only switch antenna at a certain set of time-instances, the network can ensure that the ILPC is able to keep track of the fast fading In MC-HSUPA operation the network can specify which carrier(s) that the UE should base the decision on whether it should switch transmit antenna. This could be beneficial for, e.g., the scheduler.

DETAILED DESCRIPTION

Figure 5:
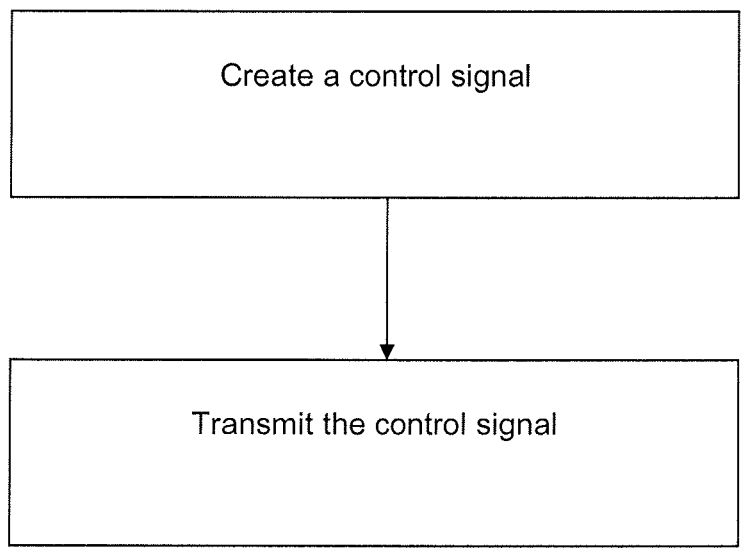
FIGS. 5, 6 and 7 are flow charts illustrating embodiments of method steps.

According to an embodiment of the present invention, a method in a wireless access network node for controlling a UE is disclosed. The UE comprises at least two transmit antennas, and is capable of uplink transmit diversity. There is an antenna weight associated with each transmit antenna. The wireless access network node creates a control signal that comprises control information and transmits it to the user equipment. The control information controls an autonomous selection of the antenna weights in the UE. See FIG. 5.

The control information may comprise an order wherein the Node-B orders the UE to select antenna weights. In this way, the network node influences when the antenna weights will or may be changed, but the UE has the choice of which antenna weights to select. The UE may select a different set of antenna weights as compared to the set of antenna weights presently in use.

The network node may transmit control information to the user equipment, ordering it to make an autonomous selection of the antenna weights at a specified time. The point of time may be specified using e.g., the Connection Frame Numbers (CFNs). The time-instance specified could be one or more absolute points of time. The time-instance could alternatively be one or more recurring points of time. Alternatively, the point of time may be relative to the time of reception of the order.

The control information may comprise an order to toggle the use of uplink transmit diversity. I.e., if a UE receives such a message while uplink transmit diversity is enabled, it is to disable uplink transmit diversity. Conversely, if a UE receives such a message while uplink transmit diversity is disabled, it is to enable uplink transmit diversity. The control information may alternatively comprise an order to enable the use of uplink transmit diversity, or it may comprise an order to disable the use of uplink transmit diversity. It may be useful for the network to control the use of uplink transmit diversity at individual UE level in order to optimize system performance.

Alternatively, the control information comprises a permission to the user equipment to autonomously select the antenna weights. In this way, the UE may or may not decide to change antenna weights. In another wording, the network node transmits a control signal to the UE, ordering the UE to select antenna weights, but where the UE may re-select the antenna weights presently in use.

The network node may specify in the control information, the number of allowed autonomous user equipment selections of the antenna weights, a point of time or a time period during which the user equipment may autonomously select antenna weights, in absolute or relative time, or permission for the UE to select antenna weights until it receives an order to stop doing so. The control information may alternatively specify that the UE may autonomously select antenna weights until the serving cell of the UE changes. These alternatives allow the network more flexibility when controlling the use of uplink transmit diversity.

The control signal may be transmitted to the user equipment using a signal previously not allowed. This is to say that at the introduction of the present invention as specified by the appended claims, an existing channel or message may be reused, using values or combinations which were previously not allowed. Reusing existing signals prevents the need for introducing a new channel, thereby keeping the number of channels down. Alternatively, a physical channel may be introduced for controlling uplink transmit diversity, whereby a larger flexibility is allowed in the implementation. Examples of signals previously not allowed are reserved bit combinations on the Medium Access Control layer 2, Transport Format and Resource Indicator values previously not allowed, transmitted on a High Speed-Shared Control Channel, the absolute grant value "inactive" on a secondary Enhanced-Dedicated Channel Radio Network Temporary Identifier over an Enhanced-Absolute Grant Channel.

If the user equipment is configured for multi-carrier operation, the network node may explicitly specify on which carrier the user equipment should base its selection of antenna weights, by indicating a carrier in the control information. Alternatively, the network node may implicitly specify on which uplink carrier the user equipment should base its selection of antenna weights, by transmitting the control signal on the corresponding downlink carrier.

Figure 6:
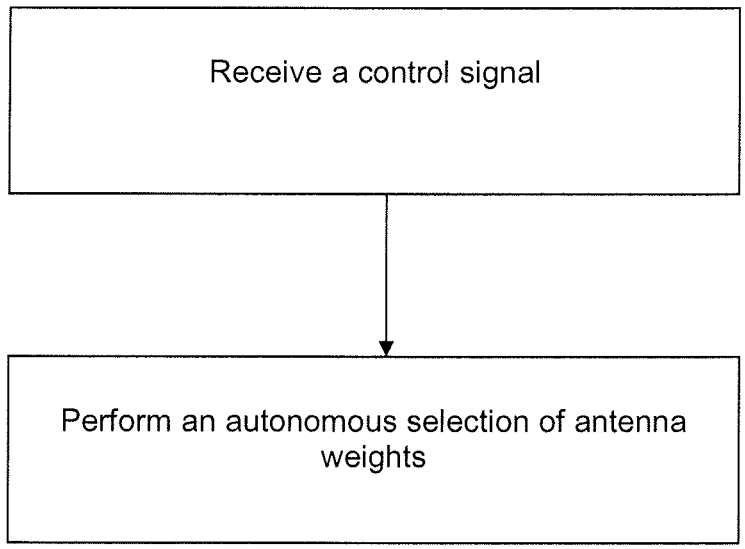

FIG. 6 illustrates a method in a user equipment, where the user equipment is adapted to be used in a wireless access network, and is controlled by a wireless network node. The user equipment comprises at least two transmit antennas, and is capable of uplink transmit diversity, whereby an antenna weight is associated with each transmit antenna. The method comprises performing an autonomous selection of the antenna weights, and transmitting a control signal to the wireless network node, in which the control signal comprises information on an autonomous selection of the antenna weights.

Figure 7:
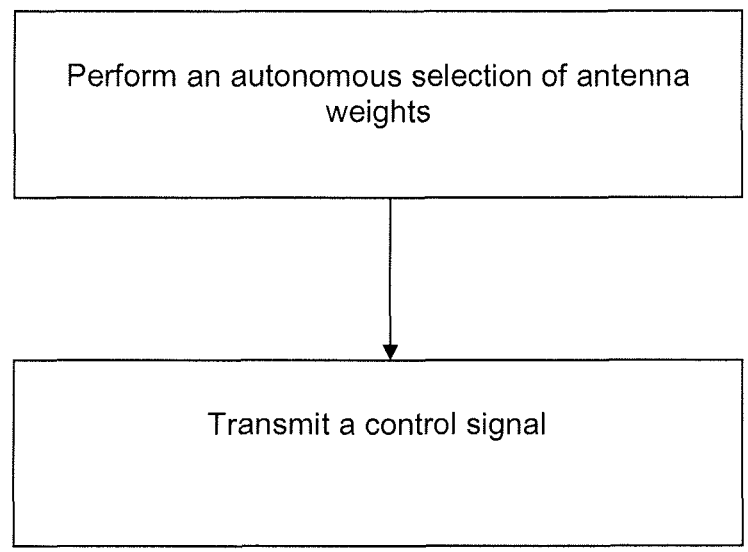

FIG. 7 illustrates a method in a user equipment, where the user equipment is adapted to be used in a wireless access network, and is controlled by a wireless network node. The user equipment comprises at least two transmit antennas, and is capable of uplink transmit diversity, whereby an antenna weight is associated with each transmit antenna. The method comprises performing an autonomous selection of the antenna weights, and transmitting a control signal to the wireless network node, in which the control signal comprises information on an autonomous selection of the antenna weights. The user equipment may first autonomously select antenna weights, and subsequently inform the network node of the fact that it has changed antenna weights. Alternatively, the user equipment may first inform the network node of the UE's intention to change antenna weights, and thereafter perform the selection of antenna weights.

Figure 8:
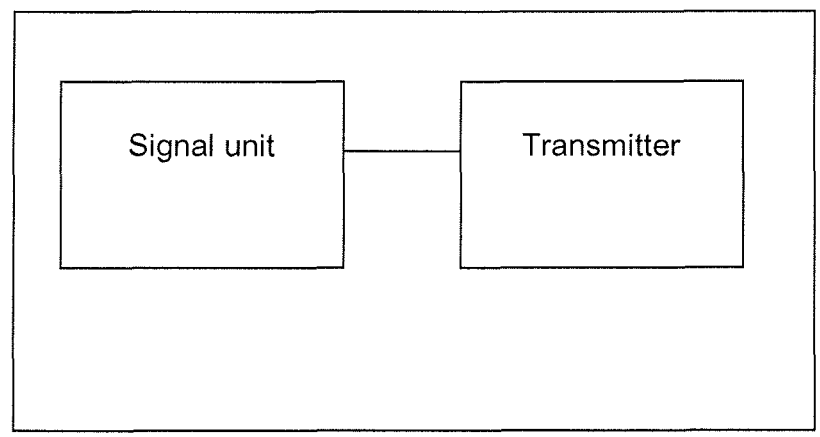
FIG. 8 is a block diagram illustrating a wireless network node.

FIG. 8 illustrates a wireless access network node being adapted to control a user equipment comprising at least two transmit antennas. The user equipment is capable of uplink transmit diversity, and has an antenna weight associated with each transmit antenna. The wireless network node comprises a determining unit that is adapted to determine that the antenna weights of the user equipment may be controlled, a signal unit adapted to create a control signal comprising control information, and a transmitter adapted to transmit the control signal to the user equipment. The control information is adapted to control a user equipment autonomous selection of the antenna weights.

Figure 9:
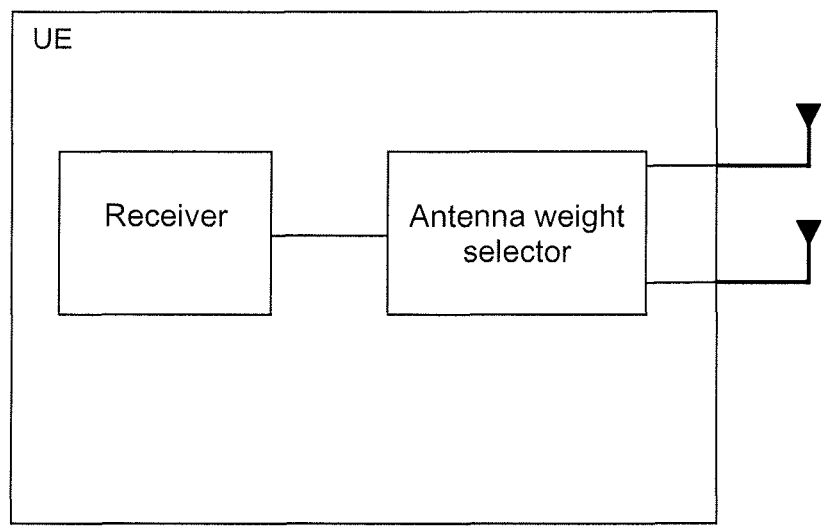
FIG. 9 is a block diagram illustrating a user equipment.

FIG. 9 illustrates a user equipment being adapted to be used in a wireless access network. The user equipment is adapted to be controlled by a wireless network node, wherein the user equipment comprises at least two transmit antennas. The user equipment is capable of uplink transmit diversity, and has an antenna weight associated with each transmit antenna. The user equipment further comprises a receiver adapted to receive a control signal from the wireless network node, the control signal comprising control information controlling an autonomous selection of the antenna weights, and an antenna weight selector adapted to autonomously select the antenna weights according to the control information.

The control signal can be so constructed; so that it is not intelligible to user equipments not capable of uplink transmit diversity. In this way, an order to enable or disable the use of uplink transmit diversity can be sent to several UEs or even broadcasted in a cell, and only the UEs capable of uplink transmit diversity will act upon the order. Any UE not capable of uplink transmit diversity will discard the control signal.

The network node as disclosed herein may be implemented as a Node-B. Alternatively, it may be implemented in another node, such as an RNC. As a further alternative, the network node may be distributed between a Node-B and an RNC. By way of non-limiting example, a Node-B will be used to illustrate the network node.

Within this document, it is understood that when a UE selects a set of antenna weights, it also applies the set of antenna weights without undue delay.

The notion of autonomous selection is to be construed such that the UE is presented with a choice of more than one set of antenna weight values, from which the UE may, independently from the network node, select one set.

According to a first embodiment of the invention, a Node-B can send a control signal (e.g., an HS-SCCH order or L2 MAC orders) to a specific UE ordering it to change transmit antenna at a well defined point in time, e.g. a specified number of milliseconds after the reception of the order. This allows Node-B to know when to expect the change and to prepare its receiver accordingly. Examples whereby the L2 MAC orders include:

Use special fields in the MAC L2 layer where there currently exist reserved bit combinations (e.g., a certain bit sequence of the Length field in MAC-hs header; see section 9.2.1-9.2.2 in 3GPP TS 25.321 v8.6.0)

Use a special value of the TFRI that currently is not used (see 9.2.3.1 in 3GPP TS 25.321 v8.6.0). These are signaled on the HS-SCCH. Currently 6 bits are used to signal a total of 46 different values.

Transmit the absolute grant value "inactive" using the secondary E-RNTI over E-AGCH while having assigned individual secondary E-RNTIs to all UE. Currently this message is ignored by the UE (see section 10 in 3GPP TS 25.212 v8.5.0).

According to a second embodiment of the invention a Node-B can send a control signal (e.g., an HS-SCCH order or L2 MAC signaling) to a specific UE ordering it to activate (deactivate) the use of uplink transmit diversity. The activation order of could also be combined with a requirement specifying the time-instances where the UE is allowed to switch antennas (e.g., the Connection Frame Numbers (CFNs) at which an antenna switch is allowed). The time-instance specified could be one or more absolute points of time. The time-instance could alternatively be one or more recurring points of time. The criteria specifying the time-instances where the UE is allowed to change transmit antenna could either be signaled by RRC, signaled in the L1 control signal (e.g., by utilizing the order bits in the HS-SCCH order), or be predetermined (hard-coded) by the standard. Several different rules for determining how long the UE is allowed to utilize uplink-transmit-diversity are possible; including Until the UE receives an explicit order to stop (i.e. a deactivation order)

For a pre-determined time-period

For a predetermined number of antenna switches, and/or

Until the UE performs a serving cell change.

Figure 1:
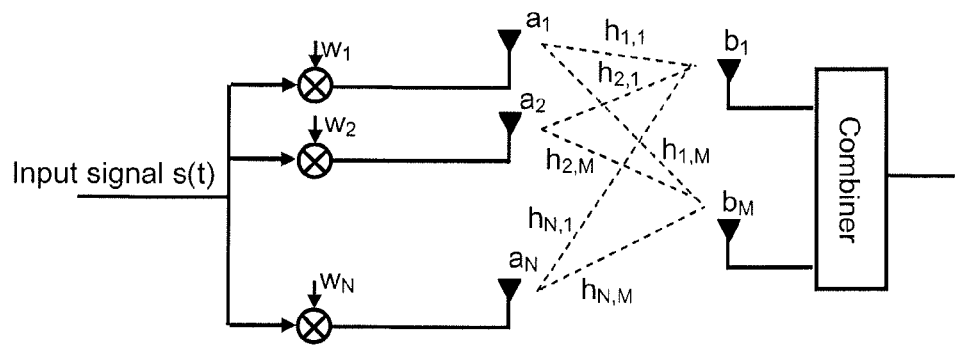
FIG. 1 is an illustration of uplink transmit diversity.
Figure 2:
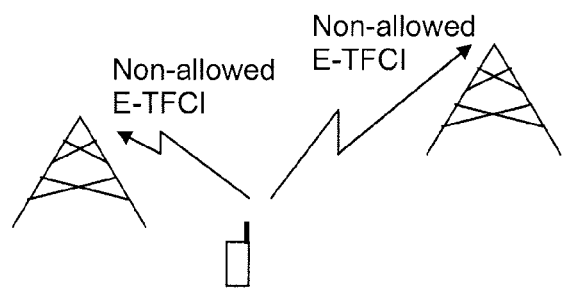
FIG. 2 is a communication scheme illustrating an embodiment of the invention.

In yet another embodiment of the invention, the UE, after it has changed antenna, informs the Node-B(s) that it has changed antenna. This could be achieved by utilizing the E-TFCIs that UEs are not allowed to use (see E-TFCI 120 in Table 0, E-TFCI 115 in Table 1, E-TFCI 127 in Table 2, E-TFCI 101/102 in Table 3 in 3GPP TS 25.321 v8.6.0). This could be used for all UEs belonging to Rel-7 or later (Table 2 and Table 3). Note that this signaling would allow that both serving and non-serving Node-Bs become aware of that the UE has changed antenna in the case of soft handover; see FIG. 2. As an alternative, this embodiment can be modified in that the UE informs the Node-B that the UE intends to change its antenna weights. Note that this embodiment would also be applicable in a scenario where all UEs always are allowed to utilize uplink transmit diversity.

In another embodiment of the invention that targets MC-HSUPA operation the control signals could be used to signal which of the uplink carriers that the UE should consider when evaluating whether it should switch transmit antenna. This information could be beneficial, e.g., if the resource situations (e.g., grants) are different for the two uplink carriers. This information could be signaled by:

That the Node-B transmits the control signal on the downlink carrier that corresponds to the uplink carrier that the UE should consider when deciding whether an antenna switch should occur.

Explicit signaling where, for example, the order bits are used to indicate which of the uplink carrier that the UE should consider when evaluating whether an antenna switch should occur.

Figure 3:
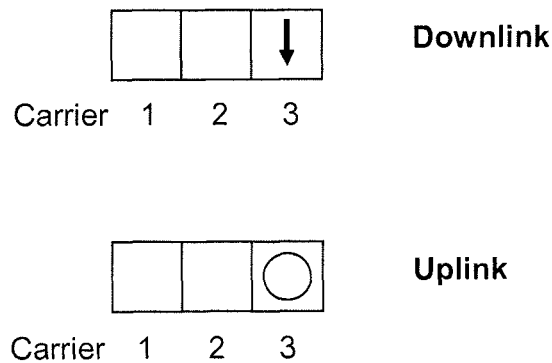
FIGS. 3 and 4 illustrate multi-carrier operation according to embodiments of the invention.
Figure 4:
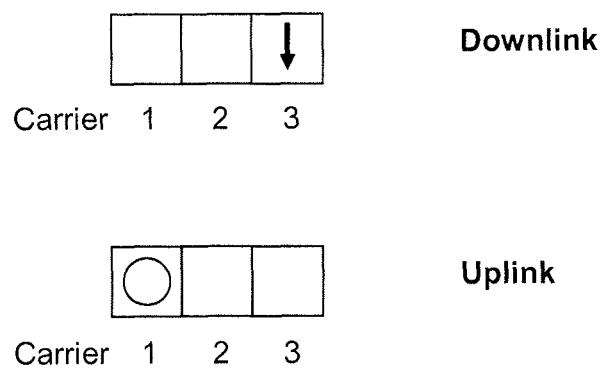

These alternatives are illustrated in FIG. 3 and FIG. 4, respectively. For the illustration, an example of three carriers is taken.

In FIG. 3, the network node transmits a control signal comprising an HS-SCCH order activating uplink transmit diversity and stating that decisions of the UE on changing antenna weights should be based on the uplink carrier 3. Optionally, the control signal can in addition be an order to enable uplink transmit diversity.

In FIG. 4, a the network node transmits a control signal to the user equipment. In this case, the control signal comprises an HS-SCCH order activating uplink transmit diversity. By setting the order bits to $x_{ord,1}x_{ord,2}x_{ord,3}=100$ it states that the UE's decision for antenna weights should be based on the uplink carrier 1. Correspondingly, $x_{ord,1}x_{ord,2}x_{ord,3}=010$ would indicate that uplink carrier 2 should be the base for the UE's selection of antenna weights. As an option, this control signal may simultaneously be an order to enable the use of uplink transmit diversity.

At the 3GPP RAN#45 RAN plenary, a study item on uplink transmit diversity for HSPA was agreed. According to the study item description the objective is to evaluate the potential benefits of uplink transmit diversity techniques that:

Do not require any newly standardized dynamic feedback signaling between the network and UE Allow transmission from one antenna (e.g., switched antenna transmit diversity)

Allow transmission from two transmit antennas (e.g., transmit beam forming)

In this description some initial considerations on the impact that uplink transmit diversity will have on the Node-B and UE are presented.

Some Initial Consideration on Uplink Transmit Diversity Concepts

This section describes issues that may need to be considered when evaluating the potential benefits of uplink transmit diversity.

Network Related Issues

The importance of considering these issues will depend on the gains that the uplink transmit diversity schemes aim for. For example, if the objective is to capture the gains arising from slow variations (e.g., the one antenna may be obstructed) then the related problem may be of less importance than if the schemes also target to capitalize on the fast fading variations.

Channel Estimation

In order to ensure an adequate receiver performance, the Node-B needs to maintain a channel estimate. To avoid too rapid changes in the channel estimate used by the receiver this is typically based on a filtered version of the estimated instantaneous channel (measured by the Node-B) over several slots. Thus, when a sudden change in the effective channel between the UE and Node-B, e.g., because the UE has changed transmit antenna, there is some delay until the channel estimate used in the receiver has adapted to their new values. Until this adaptation has been completed the Node-B receiver performance will experience degradation. As a result, switched antenna diversity techniques in which the UE changes its transmit antenna too often will result in poor channel estimates. This will in turn degrade overall performance. A similar line of reasoning can be applied to beam forming if the antenna weights are changed too often and/or too abruptly. Note also the same problem may exist if the Node-B utilizes interference estimates based on filtered measured interference values.

Effect of Power Discontinuities

Another effect of applying uplink transmit diversity techniques is that it may result in that there is a discontinuity in the power received by the Node-B when the effective channel between the UE and Node-B is changed. This discontinuity will be a combined effect of that:

The channel between the two transmit antennas and the receiving antennas are different.

The antenna gain of the two transmit antennas may be different.

Due to this power discontinuity it will, subsequent to an antenna switch, take a number of slots until the ILPC (and OLPC) have reached their stable values. For switched transmit antenna diversity it should also be realized that when the UE has switched antenna it will, if for example the channel from the 'new' transmit antenna is much better than the channel associated with the 'old' transmit antenna, result in an increase in the noise rise. In the prolonging this may, through the OLPC and/or ILPC, cause other UEs to increase their transmit power. Clearly, the magnitude of this effect depends on how often the UE switches transmit antenna and how much the channel differs for the two transmit antennas.

Notice that also beam forming techniques may result in larger and faster interference variations. In particular, this may occur when the shape and/or direction of the beam is abruptly changed.

Path Searcher Algorithms

Another aspect that may need to be considered is how an abrupt change in the channel influences the path searcher. Abrupt changes could for example be an effect of the UE switching transmit antenna. In fact, for some situations it is not sure that the path searcher is able to keep track of all relevant paths, which could lead to performance degradation. Note that this could be an effect of the two transmit antennas, in reality, having different and spatially varying antenna pattern. In other words, this does not necessarily need to be an effect of the fast fading.

UE Related Issues

While the previous section outlined a few potential issues related to the Node-B this section briefly outlines some UE related issues. Some of these issues have previously been discussed in 3GPP RAN4 during the work with Rel-9.

To start with, beam forming will require that the UE has two power amplifiers. If it should be possible to support antenna weights where the UE only utilizes one of these antennas (and it should be possible to utilize any of the transmit antennas) each of the power amplifiers (PAs) must further be capable of supporting the maximum UE transmit power alone if the same coverage is to be maintained. For switched transmit antenna diversity, a single PA would be sufficient. However, compared to the case where the UE always transmits from one of the two antennas only, there will be an additional insertion loss incurred by the switch.

Finally we also notice that the uplink transmissions influence the UE receiver performance. The magnitude of this impact will depend on the isolation between the transmit branches and the receive branches. To ensure that the downlink performance is not affected by the introduction of uplink transmit diversity it is necessary to ensure that isolation between all transmitting and receiving antennas is similar.

Above described are a few potential improvements associated with prior art uplink transmit diversity. Particularly, if the UE changes transmit antenna too often (alternatively the shape of the beam and/or direction) there could be a performance degradation. This potential degradation may stem from:

Reduced accuracy of the channel estimation algorithms used in the Node-B.

Reduced accuracy of the interference estimations used in the Node-B

Potentially increased interference variations (cf. beam forming effects).

Reduce efficiency of the inner loop power control.

While part of these effects can be captured in simulations other aspects are implementation dependent and difficult to capture in a simulation. However, considering the reasons above, it may be beneficial to allow the network to control whether a UE utilizes uplink transmit diversity. To not restrict the applicability of uplink transmit diversity this could if deemed necessary be handled via RRC signaling.

Aside from relying on Radio Resource Control (RRC) signaling (which would require RAN2 involvement) there are other options that one could consider as complements. For example, Let the Node-B determine when/if a UE should be allowed to utilize uplink transmit antenna diversity. This could be done by means of HS-SCCH orders.

Let the UE notify the Node-B when an antenna switch (alternatively sufficiently abrupt change in the antenna weights) will occur (or has occurred). This could for example be achieved by reusing E-TFCIs that are currently prohibited.

Update the Node-B algorithms and include algorithms for estimating when an antenna switch occurs and (possibly) also algorithms that maintain separate estimates of the channels associated with the different antennas (in the case of switched antenna diversity).

Yet another approach could be that RAN4 introduces additional requirements that specify the desired (and undesired) UE behavior. An example of such requirements could involve specifying when, and how often the UE is allowed to change antenna for antenna switched diversity or change antenna weights in the case of beam forming.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method in a wireless access network node for controlling a user equipment, wherein the user equipment is capable of uplink transmit diversity and comprises at least two transmit antennas, wherein an antenna weight is associated with each transmit antenna, and wherein the method comprises:

creating a control signal comprising control information that controls whether the user equipment is permitted to autonomously select the antenna weights; and transmitting the control signal to the user equipment.

2. The method of claim 1, wherein the control information also comprises an order to the user equipment to make an autonomous selection of the antenna weights.

3. The method of claim 2, wherein the control information also comprises an order to the user equipment to make an autonomous selection of the antenna weights at a specified time.

4. The method of claim 1, wherein the control information comprises an order to enable, disable or toggle use by the user equipment of uplink transmit diversity.

5. The method of claim 1, wherein the control information comprises permission to the user equipment to autonomously select the antenna weights.

6. The method of claim 5, wherein the control information comprises information indicating a number of allowed autonomous user equipment selections of the antenna weights.

7. The method of claim 5, wherein the control information comprises information on a time period during which the user equipment may autonomously select the antenna weights.

8. The method of claim 5, wherein the control information comprises permission to the user equipment to autonomously select the antenna weights until it receives an order to stop.

9. The method of claim 5, wherein the control information comprises permission to the user equipment to autonomously select the antenna weights until a serving cell change occurs.

10. The method of claim 5, wherein the control information comprises permission to the user equipment to autonomously select the antenna weights at a specified time.

11. The method of claim 1, wherein the control signal is transmitted to the user equipment using a reserved value.

12. The method of claim 1, wherein the control signal is transmitted to the user equipment on the Medium Access Control layer 2.

13. The method of claim 1, wherein the control signal is transmitted to the user equipment using a reserved Transport Format and Resource Indicator value, and wherein the control signal is transmitted on a High Speed-Shared Control Channel.

14. The method of claim 1, wherein the control signal is transmitted to the user equipment as an absolute grant value "inactive" on a secondary Enhanced Dedicated Transport Channel—Radio Network Temporary Identifier over an Enhanced Dedicated Transport Channel—Absolute Grant Channel.

15. The method of claim 1, wherein the control signal is transmitted on a physical channel that is allocated primarily for controlling uplink transmit diversity.

16. The method of claim 1, wherein the network node and the user equipment are configured for multi-carrier operation, and wherein the control information comprises an indication of a carrier on which the user equipment is to base its selection of antenna weights.

17. The method of claim 1, wherein the network node and the user equipment are configured for multi-carrier operation, wherein the control signal is transmitted on a downlink carrier, and wherein the control signal includes an instruction to the user equipment to base the autonomous selection of antenna weights on an uplink carrier corresponding to the downlink carrier.

18. A method in a user equipment configured to be used in a wireless access network and to be controlled by a wireless network node, wherein the user equipment is capable of uplink transmit diversity and comprises at least two transmit antennas, wherein an antenna weight is associated with each transmit antenna, and wherein the method comprises:

receiving a control signal from the wireless network node, the control signal comprising control information that controls whether the user equipment is permitted to autonomously select the antenna weights; and based on the control information indicating that the user equipment is permitted to autonomously select antenna weights, performing autonomous selection of the antenna weights.

19. A method in a user equipment configured to be used in a wireless access network and to be controlled by a wireless network node, wherein the user equipment is capable of uplink transmit diversity and comprises at least two transmit antennas, wherein an antenna weight is associated with each transmit antenna, and wherein the method comprises:

performing an autonomous selection of the antenna weights; and transmitting a control signal to the wireless network node, the control signal comprising information on an autonomous selection of the antenna weights.

20. The method of claim 19, wherein the control signal is transmitted to the wireless network node using a reserved Enhanced-Dedicated Channel Transport Format Combination Indicator.

21. The method of claim 19, wherein the control signal comprises information on a performed autonomous selection of the antenna weights.

22. The method of claim 19, wherein the control signal comprises information on a planned autonomous selection of the antenna weights.

23. A wireless access network node configured to control a user equipment that is capable of uplink diversity and comprises at least two transmit antennas, wherein an antenna weight is associated with each transmit antenna, wherein the wireless access network node comprises:

a signal unit configured to create a control signal comprising control information that controls whether the user equipment is permitted to autonomously select the antenna weights; and a transmitter configured to transmit the control signal to the user equipment.

24. A user equipment configured to be used in a wireless access network and to be controlled by a wireless network node, wherein the user equipment is capable of uplink transmit diversity and comprises at least two transmit antennas, wherein an antenna weight is associated with each transmit antenna, and wherein the user equipment comprises:

a receiver configured to receive a control signal from the wireless network node, the control signal comprising control information that controls whether the user equipment is permitted to autonomously select the antenna weights; and an antenna weight selector configured to, based on the control information indicating that the user equipment is permitted to autonomously select antenna weights, autonomously select the antenna weights.

* * * * *

UNITED STATES PATENT AND TRADEMARK OFFICE
CERTIFICATE OF CORRECTION

| | |
|---|---|
| PATENT NO. | : 8,914,067 B2 |
| APPLICATION NO. | : 13/500116 |
| DATED | : December 16, 2014 |
| INVENTOR(S) | : Bergman et al. |

Page 1 of 1

It is certified that error appears in the above-identified patent and that said Letters Patent is hereby corrected as shown below:

In the Specification

In Column 4, Line 9, delete "pre-deter wined" and insert -- pre-determined --, therefor.

In Column 8, Line 32, delete "a the" and insert -- the --, therefor.

Signed and Sealed this
Fifteenth Day of December, 2015

Michelle K. Lee
*Director of the United States Patent and Trademark Office*